United States Patent
Woytowitz, Jr.

(10) Patent No.: US 6,293,228 B1
(45) Date of Patent: Sep. 25, 2001

(54) WILDLIFE HOMES

(76) Inventor: Joseph L. Woytowitz, Jr., 2716 Erdman Ave., Baltimore, MD (US) 21213

(*) Notice: Subject to any disclaimer, the term of this patent is extended or adjusted under 35 U.S.C. 154(b) by 0 days.

(21) Appl. No.: 09/508,457

(22) PCT Filed: Apr. 27, 1999

(86) PCT No.: PCT/US99/09056

§ 371 Date: Mar. 10, 2000

§ 102(e) Date: Mar. 10, 2000

(87) PCT Pub. No.: WO99/55147

PCT Pub. Date: Nov. 4, 1999

Related U.S. Application Data

(60) Provisional application No. 60/083,543, filed on Apr. 29, 1998, and provisional application No. 60/087,359, filed on May 29, 1998.

(51) Int. Cl.[7] .............................. A01K 31/06; E04B 1/00
(52) U.S. Cl. ..................... 119/452; 119/417; 52/171.1; 52/236.1
(58) Field of Search ................... 119/452, 417; 52/171.1, 236.1, 236.2

(56) References Cited

U.S. PATENT DOCUMENTS

| | | |
|---|---|---|
| D. 172,340 | 6/1954 | Deam . |
| 2,566,099 | 8/1951 | Hulst . |
| 4,186,532 * | 2/1980 | Kahn .................................. 52/169.1 |
| 4,299,066 | 11/1981 | Thompson . |
| 4,905,326 * | 3/1990 | Nakamura et al. ...................... 4/488 |
| 4,958,465 | 9/1990 | Levy . |
| 5,551,372 | 9/1996 | Nicholls . |
| 5,564,239 | 10/1996 | Mitsis . |
| 5,603,189 | 2/1997 | Levy . |
| 5,855,098 | 1/1999 | Bromer . |
| 6,182,408 * | 2/2001 | Poehler ................................ 52/234 |

* cited by examiner

Primary Examiner—Charles T. Jordan
Assistant Examiner—Yvonne R. Abbott
(74) Attorney, Agent, or Firm—Venable; John P. Shannon; Chad C. Anderson

(57) ABSTRACT

A group of connecting homes (20), commercial and/or not-for-profit buildings that serve to enclose a self-sustaining wildlife habitat sanctuary (23), specifically targeting the natural environment of endangered species, where appropriate. The homes (20) serve as an impenetrable cage wall (8), much like the walls of a mountain valley, preventing animals from entering or exiting the habitat, with the possible exception of migrating birds and fish. On one side of the homes there is a self-sustaining habitat (23) and on the other side of the homes there is modem civilization. The walls of the homes facing the habitat may have shatterproof glass windows (5) or a caged terrace (6), allowing inhabitants of the building to safely observe the enclosed habitat, and human access to the habitat may be restricted to observation through windows, observation from the caged terrace, or hikes through caged walking paths (14, 15, 16, 17).

21 Claims, 8 Drawing Sheets

WILDLIFE HOMES

This application is a 371 of PCT/US99/09056 which claims benefit of 60,083,543 filed Apr. 29, 1998 which claims benefit of 60,087,359 filed May 29, 1998.

BACKGROUND OF THE INVENTION

The invention "WildLife Homes" generally refers to residential and commercial real estate development, zoos, animal cages, wildlife management, and the Endangered Species Act.

Some of the more progressive real estate developers are building developments within environments where wildlife is able to enter and exit the developments freely, but no one has attempted to capture a wildlife habitat in the planned community with a traditional cage or a cage composed of connected buildings. In Yellowstone National Park, some homes are built on large estates bordering the park, where wild animals can travel through the community. In other places, communities have been built along streams, allowing residents to participate in recreational fishing conveniently. Residential homes are frequently situated only a few feet apart from each other and are typically built on land that has been flattened by bulldozers, cleared completely of trees, and cemented. Many people complain about the disappearing natural habitats, but, for the most part, developers have destroyed the maximum amount of natural habitats to allow for the maximum number of constructed homes.

Zoos have had relative success with respect to saving some animal species, but limits on zoo resources prevent zoos from saving all animals. Non economic problems include animals being unable to breed in zoos, animals breeding without natural selection, animals in small cages having limited mobility, animals losing hunting instincts, elimination of animal social groups and structures due to small animal populations, and the inability of animals to thrive in artificial environments.

Animal cages are made to prevent animals from escaping enclosed environments, but not to allow animals to survive unaided, as the animals would exist in their natural environments.

Wildlife management frequently protects wildlife habitats through buffer zones, such as farm land, timber land, and highways, but buffer zones do not solve several problems: animals crossing buffer zones risk being hunted and being hit by cars; hunters frequently enter wildlife habitats, legally or illegally, making predators' prey scarce and forcing predators to attack domestic animals for food; herbivores compete with domestic cattle for crops and gardens; logging companies unfavorably alter the environment; and people take an entrenched position on an unreasonable issue. This additional pressure on animal life, even in parks, decreases the populations of predators and scavengers, thus increasing the range that an individual group requires for a vibrant population.

The Endangered Species act generally requires that there be a plan in place to save each endangered species. This is becoming increasingly difficult. Zoos are unable to do it. The government and environmental groups cannot afford to purchase the requisite amount of land, maintain sufficient wildlife staff, recreate species' natural habitats, reintroduce disappearing species, and provide long term protection for the endangered animals. Current economic plans to save habitats and endangered species include: government subsidized parks, picture safaris, ecology tours, and hunting and fishing license fees, including big game hunting of endangered species in African and Indian parks. Habitats are rapidly disappearing permanently due to population pressure. For example, China, which has a temperate forest rainfall zone similar to the U.S., with an extremely large diversified exotic wildlife habitat, faces even greater population pressures that are compounded by the building of the Yangtze River dam, which will submerge thousands of square miles of land.

SUMMARY OF THE INVENTION

The invention "WildLife Homes" is an extremely large cage surrounding a wildlife habitat, built by connecting residential homes or commercial buildings to enclose a specific area. The invention is a new use for residential homes, a new way to build animal cages, and a new method for protecting wildlife, in particular, endangered species. The benefits and usefulness include:

Making the Endangered Species Act desirable and economical, without governmental or charitable subsidies;

Returning animals to a location from which the animals had disappeared (for example, a city or suburban park surrounded by a residential home cage, with black bears, bison, elk, bobcats, moose, red wolves, predatory birds, and the like);

Protecting animals in a location where the animals already exist;

Promoting survival of species whose natural habitat is disappearing, by recreating the identical environment inhabited by those species—for example, recreating the temperate forest zone in China which is becoming less available to animal species, due to increased Chinese human population pressures, and introducing Chinese animal species in the form of 2 pandas, 6 species of monkeys, 5 species of giant 3-foot squirrels (including two that fly), several species of deer, Asiatic bears, 24 species of pheasants, and possibly the nearly extinct 135-pound Korean or Siberian leopard into the recreated habitat;

Promoting the survival of species that have been unable to survive or breed in zoos, such as the giant panda, platypuses, and Galapagos marine iguanas;

Promoting the survival of endangered species by designing and creating habitats specifically for the endangered animals, such as migrating birds like the wood duck, trumpet swan, bog turtle, and eagles;

Allowing for a non-zoo existence for animals which have become extinct in the wild, such as the California condor, the black-footed ferret, and the red wolf;

Reversing the trend of relentless habitat loss for threatened and endangered species;

Possibly promoting the development of land in areas where development was previously prohibited, while inhibiting the amount of land actually developed, as ninety to ninety-eight percent of buildable land will be left unbuilt for the benefit of the habitat;

Dramatically reducing the threats of human over population posed to wildlife by building residential homes which will act as a cage around a recreated wildlife sanctuary; and Decreasing the size of a geographical area necessary for a vibrant diverse population by eliminating the threat of poaching and thus allowing the game animal percentage to increase, as well as the number of carnivores and scavengers.

This invention is advantageous in that, unlike zoos, the object of the invention is to create wildlife niches, enclosed by the building composed cages, which would be planned in such a way that the niche would be self-sustaining such that natural wildlife food chain cycles would prevail and reproduction would occur by natural selection. Though, for various reasons, some animals may be placed in the enclosed habitat with the intention that those animals do not reproduce.

Another advantage that this invention has over zoos is that, within the enclosed habitat, animals would be kept together in sustainable populations including herds, troops, prides and packs, allowing the animals to maintain the social structure that is present in the wild, but nonexistent in zoos.

Another advantage that this invention has over zoos is that habitats enclosed by buildings which utilize the underwater tunnel cage and allow migrating fish to exit the enclosed habitat could be used as a fish nursery, possibly for threatened species of commercial value to fishermen, such as sturgeon, salmon, shad, rock, herring, perch, and others.

BRIEF DESCRIPTION OF THE DRAWINGS

FIG. 3 is a Large Caged Habitat: 20 caged residential homes, 24 land bridge border on both sides by huge walls, with 25 path connecting 26 fragment forest, 27 stream, 28 underwater caged tunnel, 29 highway, 30 homes built on water, 31 lake, 32 duel row of caged homes built in interior of habitat with an access road in between.

DETAILED DESCRIPTION OF THE INVENTION

Figure 1:
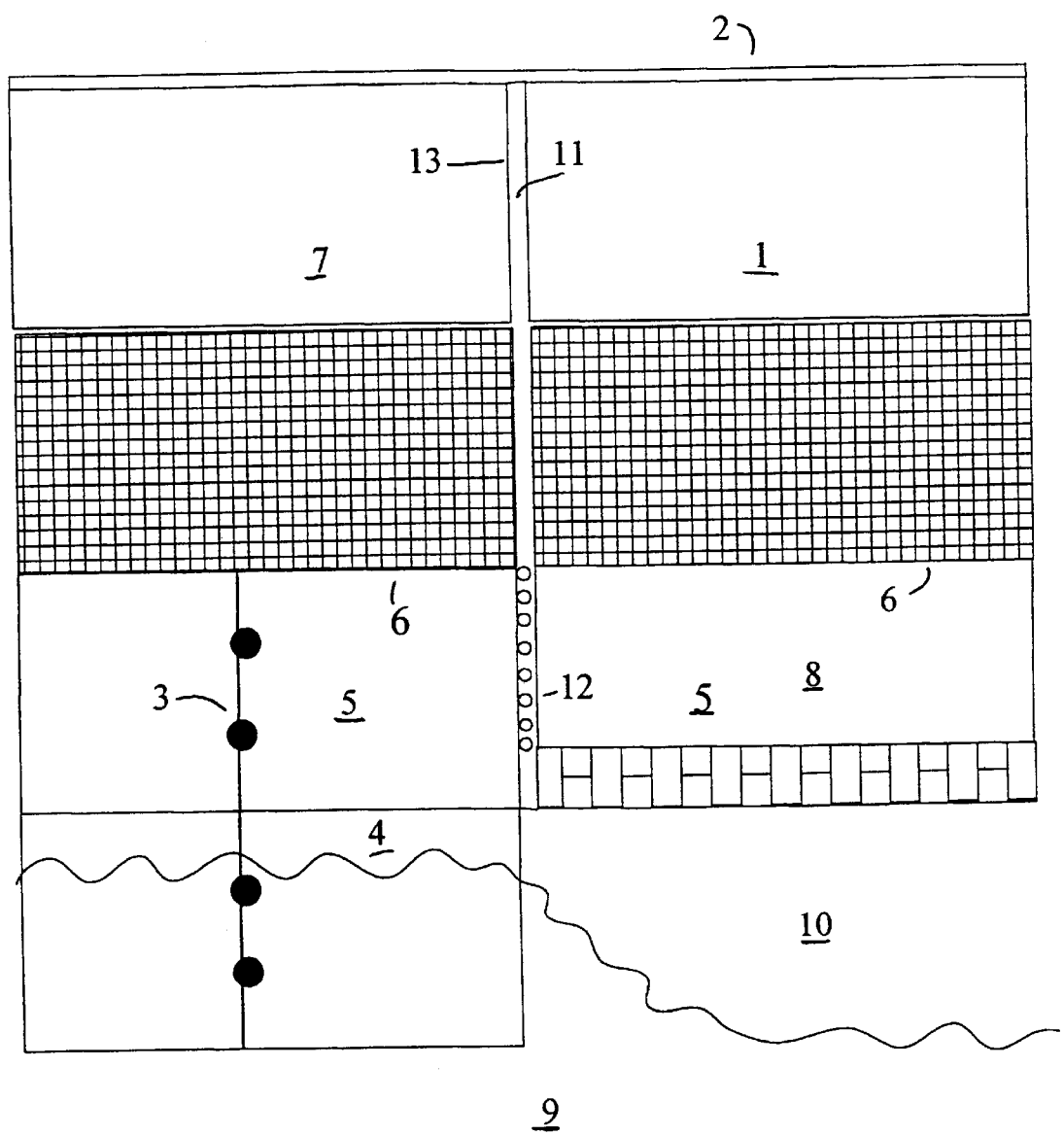
FIG. 1 is a view to Caged Homes Units from the interior of the habitat depicting: 1 standard household living facilities, 2 flat roof, 3 window washer, 4 aquatic basement, 5 first floor water tight unbreakable glass, 6 second floor bar screen, 7 third floor open deck, 8 first floor on land instead of water with six foot barrier wall, 9 pond habitat, and 10 forest habitat, 11 caged air space between some units, 12 drainage pipes for flood controls, 13 unit borders.
Figure 2:
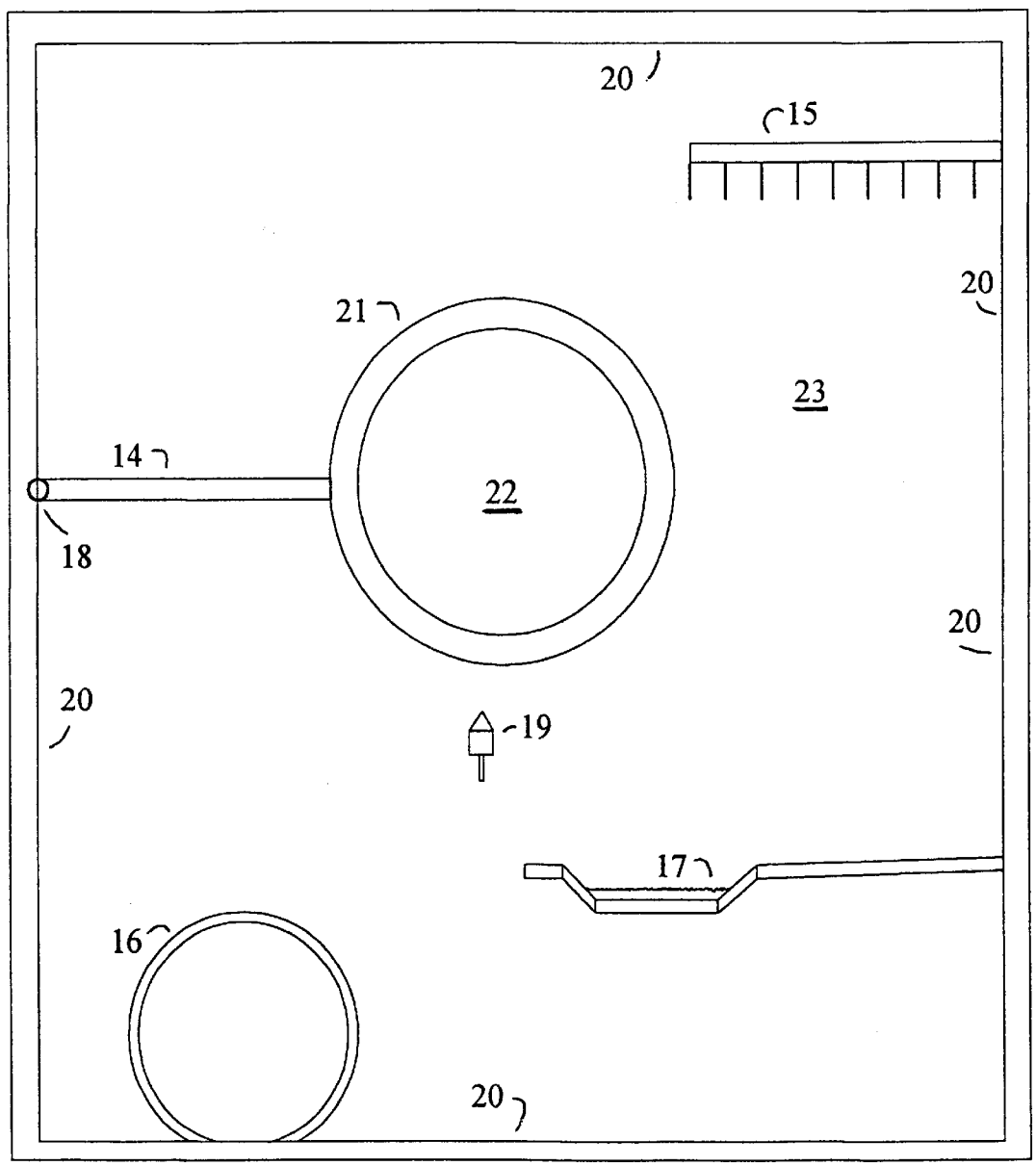
FIG. 2 is an aerial view of trails in a habitat: 14 collapsible cage trail, 15 canopy trail with stilts, 16 raised boardwalk that is also acting as a temporary enclosed observation pen, 17 trail that goes underwater, 18 trail entrance for residents with doors with knobs, 19 purple martin house, 20 caged residential homes, 21 caged café, 22 court yard, 23 wildlife habitat.
Figure 3:
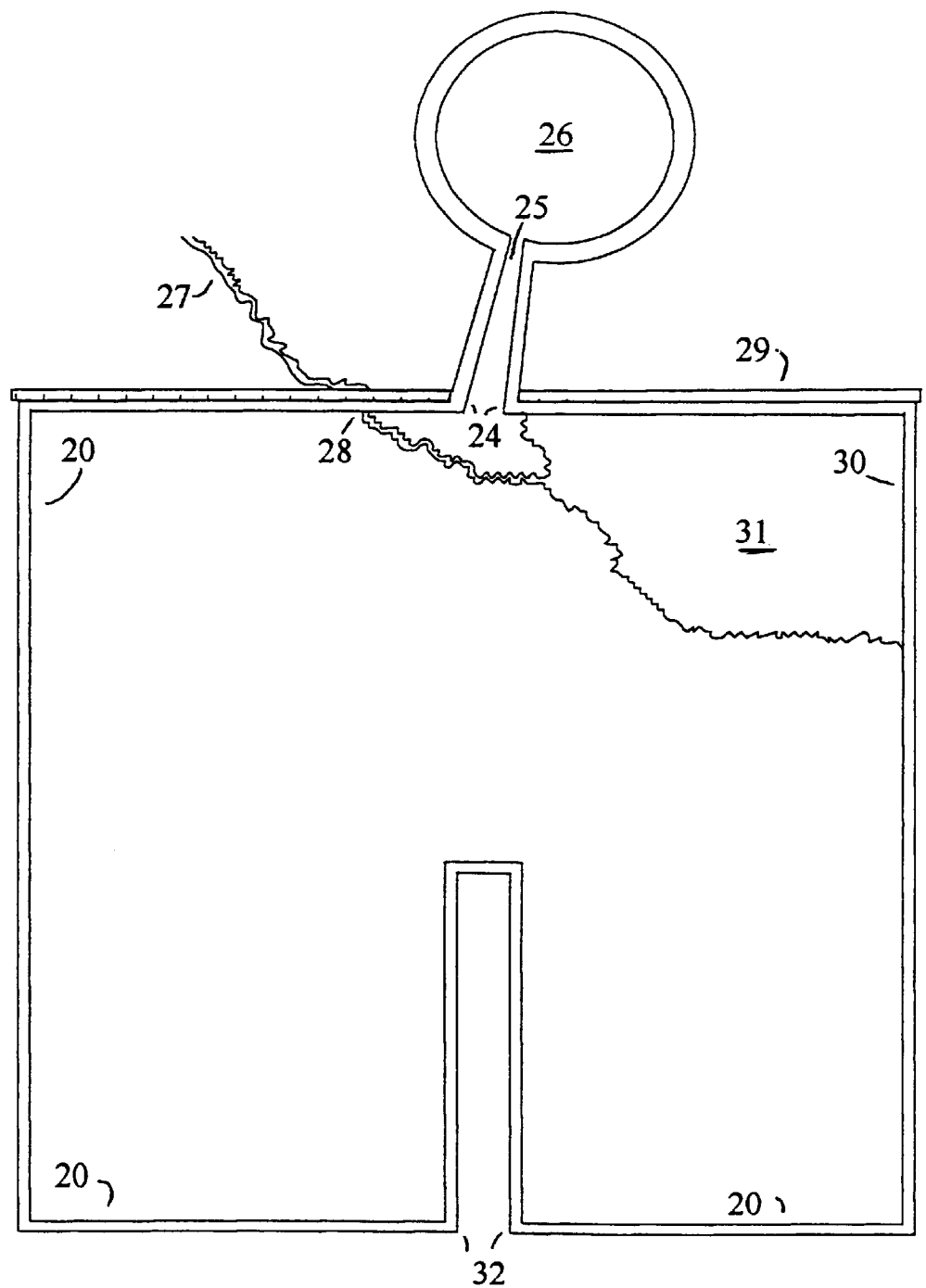
Figure 4:
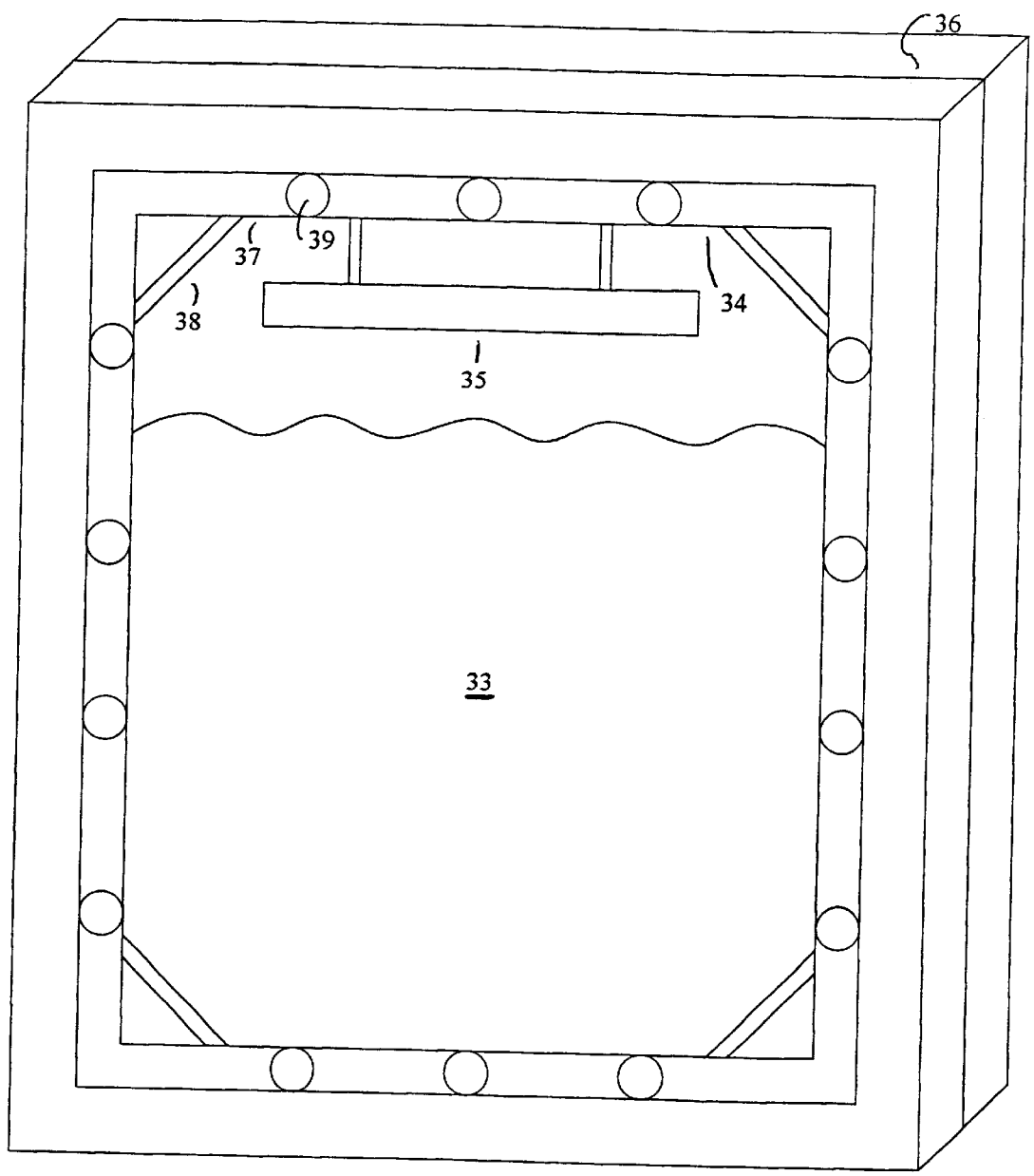
FIG. 4 shows an aquatic basement design: 33 shatter proof glass aquarium basement wall, 34 ceiling not below water level, 35 interior aquarium light, 36 double glass wall, 37 with vice, 38 bar, and 39 bolts.
Figure 5:
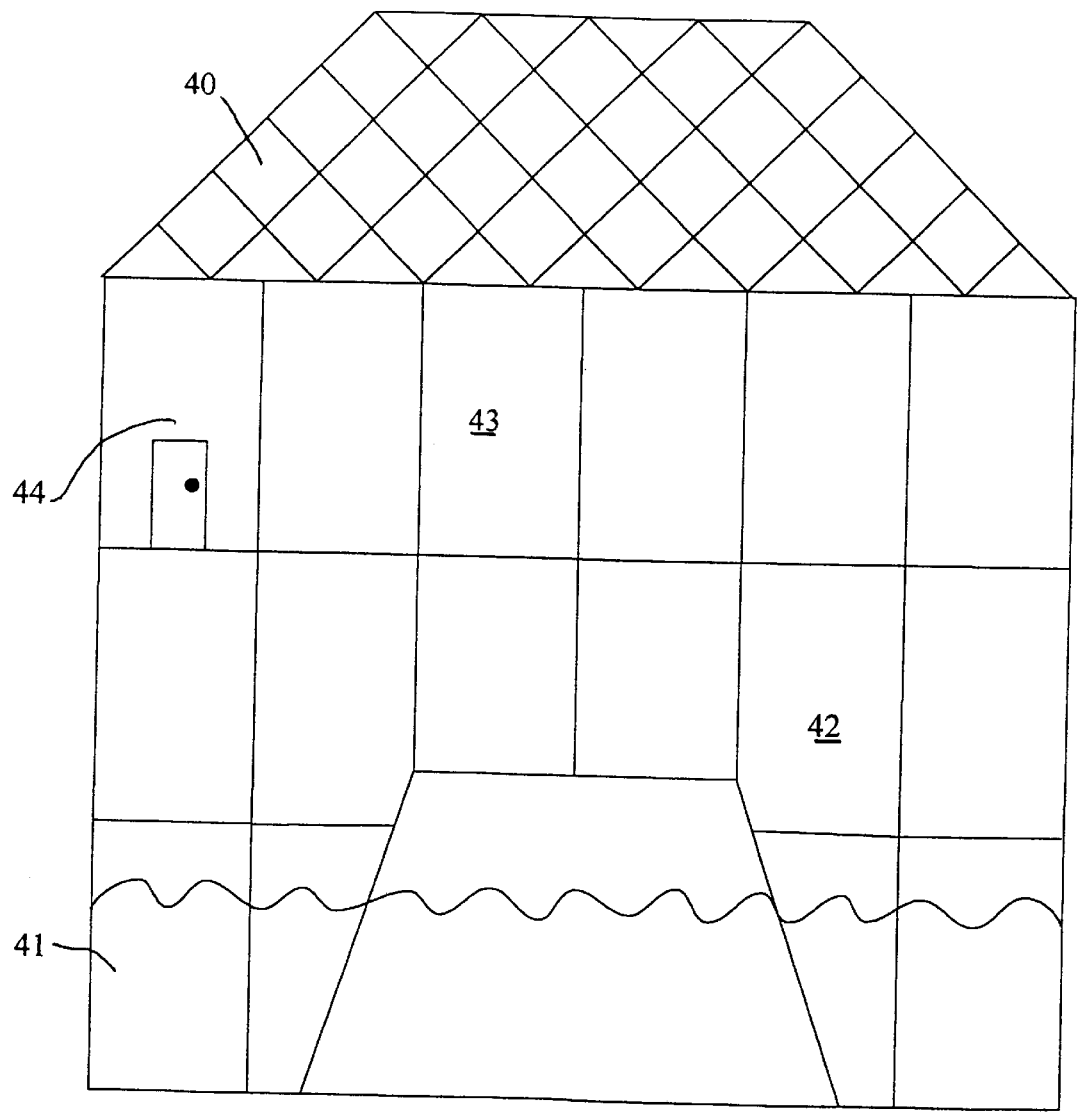
FIG. 5 shows a WildLife Home Greenhouse with insulated 40 glass ceilings, three different distinct levels: 41 an aquarium basement, 42 land for terrestrial animals, and 43 a canopy for tree top animals, and 44 residents with doors opening directly to the habitat with barrier terrace.
Figure 6A:
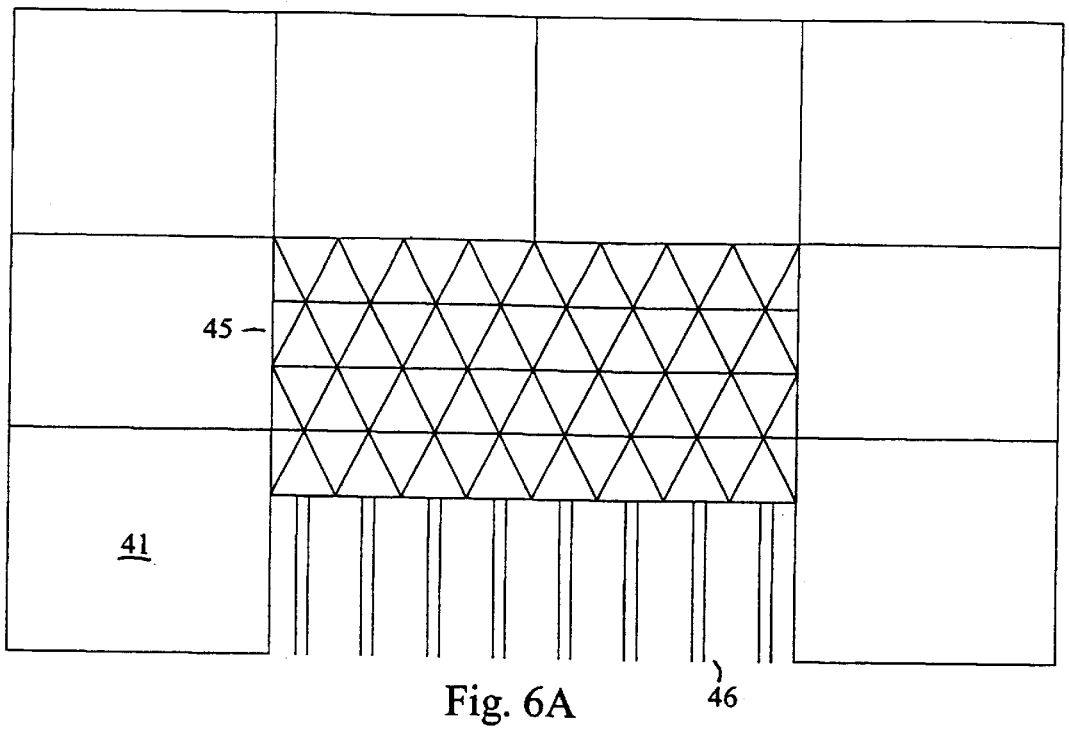
FIG. 6 illustrates an underwater 45 fence and 46 bar tunnel cage under the residential homes, allowing migrating fish to swim through, but not large animals, and an observation window in the 41 aquarium basement.
FIG. 6B shows a side view with a 45-degree slope to a depth of 15 feet, allowing small aquatic animals through but not large ones.
Figure 6:
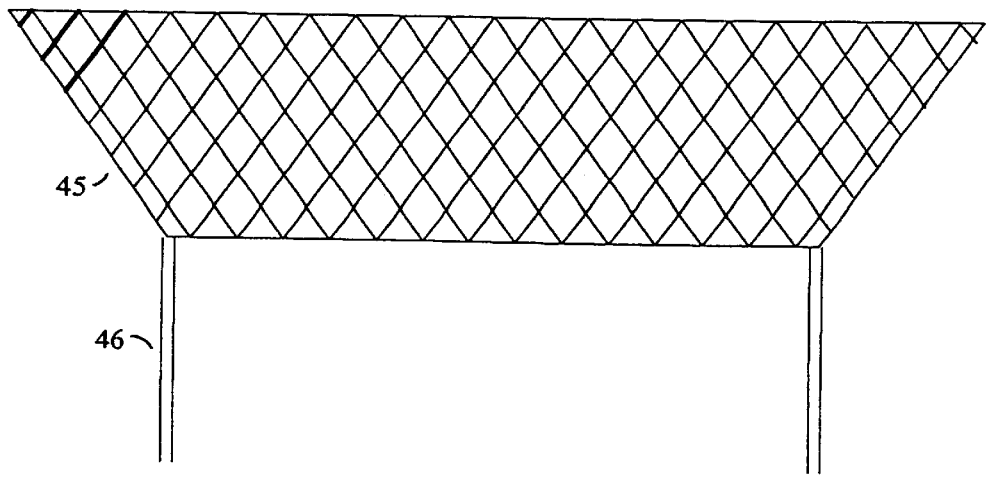
Figure 7:
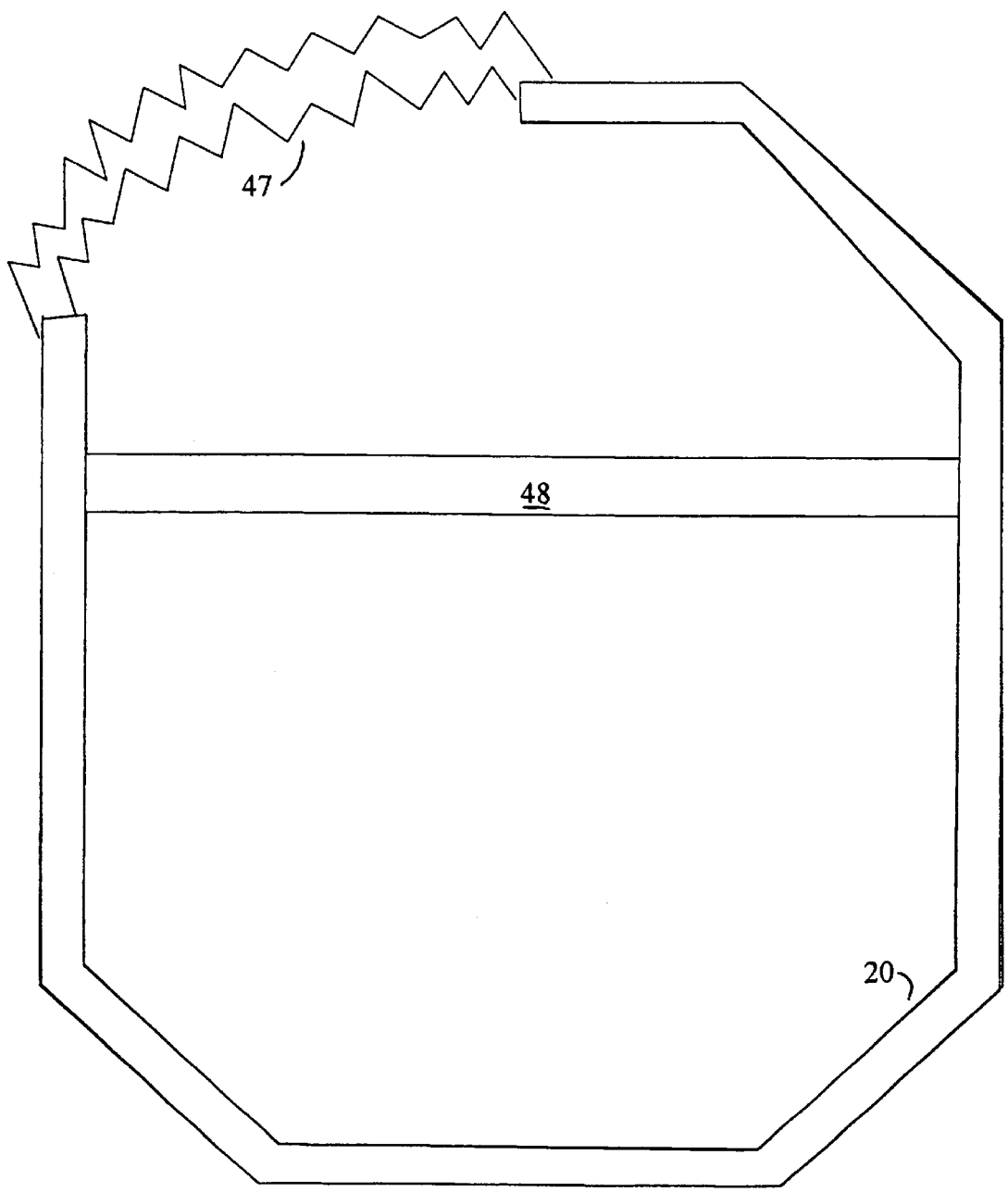
FIG. 7 shows 20 Caged Wildlife Homes surrounding a habitat, but some 47 barriers are non-homes including the sides of a mountain, a 48 cage bar going over a river and a swamp with a walking path horse trail.
Figure 8:
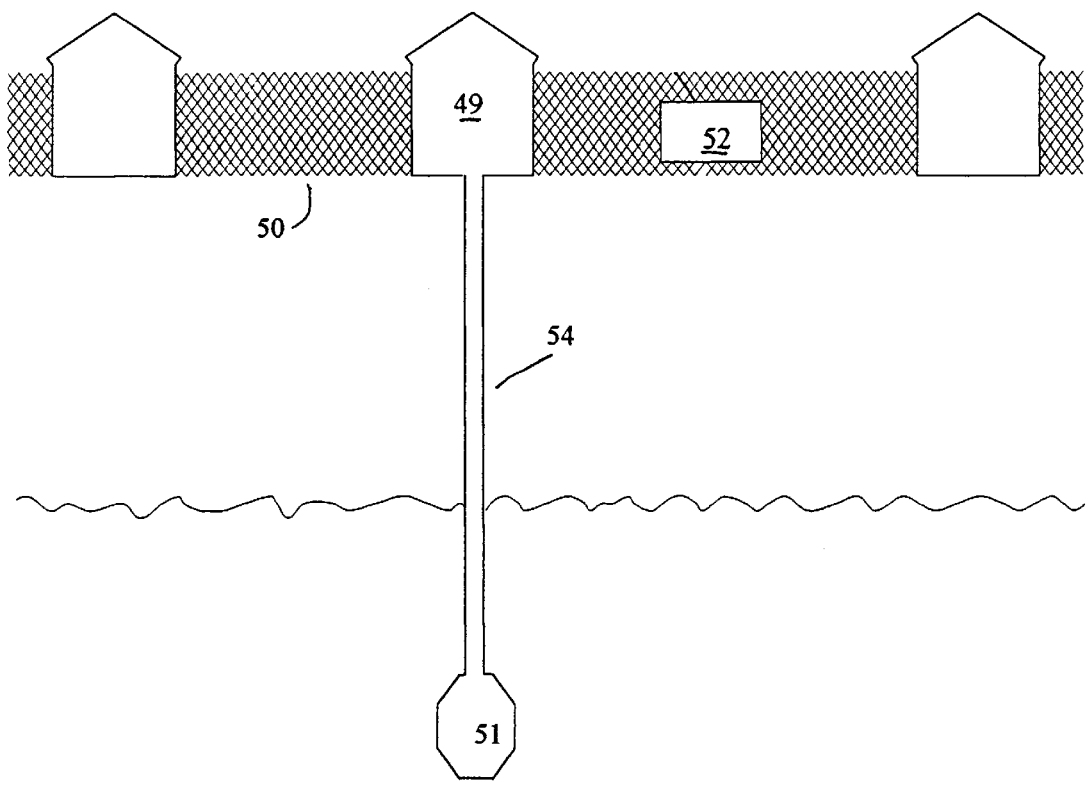
FIG. 8 shows 49 cage homes that are attached by 50 walls which act as a cage, 54 elevated raised deck goes into the habitat from resident's home leading to a 51 deck pier with side view of 41 aquatic basement. 52 Glass viewing area is available to non-residents. Side view of 54 elevated trail deck with 53 with rail fence.
Figure 8B:
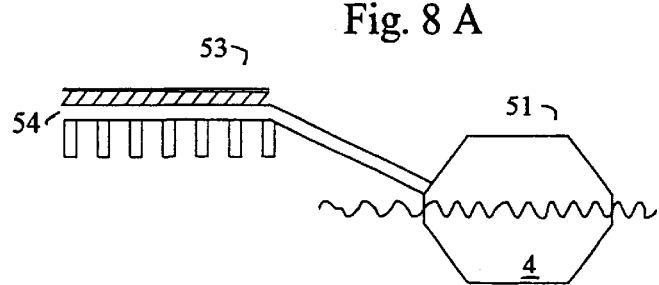

The invention "WildLife Homes" is a new type of cage to protect and secure a self-sustaining wildlife habitat zoology sanctuary refuge (or aquarium), particularly targeting endangered species. The cage surrounding the habitat is made out of attached connecting residential homes (and/or business offices, motel/hotel rooms, restaurants, social centers, government buildings, etc.). The homes serve as an impenetrable cage wall, not allowing animals in or out, except for perhaps migrating birds and fish. The walls of the homes facing the habitat can have shatterproof glass windows or a caged terrace. Otherwise, the homes have all the obvious appearances and amenities of a standard condominium or townhouse including: standard living quarters such as living rooms, bed rooms, kitchens, bathrooms, electrical outlets, plumbing, and other such features, or in the case of commercial buildings all the usual features found in such buildings. People have limited access to the caged habitat, such as nature observation through the windows of their living quarters, or taking hikes through caged walking paths.

Various features and details that differentiate the caged homes from a typical residential home can include:

Wild dangerous animals in one's backyard, perhaps a man-eater permanently living a few feet away with the residents watching without fear or concern.

The cage homes are built and designed specifically to capture and restrain the enclosed animal wildlife habitat.

The ground floor walls of the building facing the habitat can have shatterproof glass walls or other see through materials, able to withstand a charging buffalo.

For townhouses with habitats without dangerous or nuisance animals, residents can have an open air elevated deck going into the habitat, the fence rail of the deck being thick enough so that animals could not climb up. Again the homes act as an animal cage.

The homes are built primarily out of steel and stone intended to last a thousand years.

The bottom floor can be at least 6 feet off the ground, so that an animal such as a deer would not attempt to jump through the residents living room.

Some windows can be one-way windows, such that one could get closeup views of shy animals, where appropriate.

The roof of the homes can be flat, so that residents could take leisure strolls around the habitat structure.

The glass walls facing the habitat can have a mechanical device for periodic window washing. The device would be anchored in both a top and bottom crevice bordering the windows of each unit. The machine can encircle the entire enclosed structure.

In most cases the caged home does not have a back entrance, back door, or window to enter the habitat (or backyard) from the resident home.

Since there are no opportunities for a "peeping tom" to observe house occupants from the caged habitat, the walls of the habitat can be totally transparent for optimal wildlife viewing opportunities from the residence.

Differences from typical condominiums, townhomes, or other commercial buildings can include:

There can be many miles of not only continuous, but attached homes.

Due to zoning restrictions and the desire for privacy, the cage walls can have components other than buildings. There can be walls attaching the homes, where the walls are part of a cage for the wildlife habitat. In such cases, trees can hide one home from the next. In the case of an aquatic pond, the space between the homes can be available for turtles, ducks and other animals to nest, hibernate, or just get out of the water. These units can have an open deck extending into the habitat turning into a pier extending into the water with a fence rail preventing animals from climbing on the deck. The extended deck can have sufficient size to allow animals to travel under. When the deck extends into the water, it can have aquarium basement walls. Again these homes and walls act as an animal cage.

There are circumstances where some borders of the caged homes are actual cage walls, not dwellings. This can be due to the impossibility of building homes at that location, such as the property borders a river and only own one side, the other side it owns partially, but ends in a swamp. In another case, the property borders the side of a mountain. The homes still act as a viewing cage to the environment, the residents are unable to enter the habitat, outside of a caged or restricted path, and animals are unable to leave or enter the habitat.

There can be some air space between the homes, particularly higher homes in a stacked home or condo-like structure, so that severe heavy winds, including hurricanes and tornadoes, do not blow them down. The homes can still be attached by steel bars. The length of the connecting homes can be many miles and the height can exceed 100 feet, while the width of the homes may be only 30 to 40 feet.

Because of the risk of high winds, some homes may have a pyramid-like appearance so that winds would be directed over the homes.

There may be some air space between the homes to minimize risks of earthquakes and land shifts. The homes may still be attached by steel bars, and the homes will still be a cage.

There can be some air space or pipes between the homes to prevent floods from building up on only one side of the homes. The homes will still be a cage.

Building the residential homes cannot likely be done all at once for economic reasons. Instead the units are generally built as they are sold, building one stacked flat over top or next to another, or one townhouse next to another. These homes may not only be many miles long, but in order to recreate the habitat, it can be desirable to completely surround the area first and then build the units higher.

Various differences between the caged WildLife Homes habitat and normal courtyards include: Courtyards are not designed as a caged wildlife animal habitat sanctuary. Wild animals (if any) are allowed to enter in and out. Pets (if any) must be fed, replaced, and are not allowed to freely breed, unless on a small order such as insects or a goldfish pond. Predatory animals and scavengers that might eat a pet, or a desirable animal visitors are considered pests. Animals that may destroy flowers or plants, soil human areas, or bother people are also considered pests. People are able to freely enter in and out of the courtyard, as well as travel wherever they choose. Restrictions are almost nonexistent, such as: "please don't pick the flowers; keep off the grass; and don't feed the pet." Courtyards are not the home for large dangerous carnivorous animals surviving in the wild. The walls of a building facing the courtyard are not a cage wall preventing humans from entering, or a cage capturing wild animals surviving in their natural ecosystems, that may be hundreds of square miles, or a border separating civilization and a wild natural ecosystem.

This is also different from zoos in that the animals survive in the wild, and the cage for the animals are buildings, which are used for residential or commercial purposes.

There can be walking/jogging/horse trails throughout the habitat to maximize human enjoyment, scientific field study, and wildlife management. The trails may be similar to a path completely surrounded by screen fences, possibly bars with a roof, a raised boardwalk without a fenced cage, a path supported by stilts or connected to large trees to walk along the canopy of the forest, while other paths may venture under water along with unbreakable glass walls. During the time period the habitat is being built, the paths may have limited barriers to the habitat. The caged trails and other trails would allow animals to move freely within the habitat, occasionally with small bridges to allow animals to travel under. The cage trails would be examined for damage daily.

Caged trails or other barriers may temporarily be used to separate isolated populations to increase gene pools, experiment how they interact with other animals, interaction with the natural environmental, habitat destruction, breeding, raising infants for later release, teaching a zoo-bred carnivore how to hunt, study what they eat, and generally see if they can survive. This can also be used as the habitat as the residential homes are being built and at the same time, the isolated habitat may be open for other animals in the habitat to enter and leave by climbing trees, or walking from one turtle hatching pond to the next.

At night, the trails may not have lights. Residents are expected to either develop their night vision or take a flash light, so that night observation of nocturnal animals will be at its optimum.

Doors would separate some walking pathways including exits. These doors would have knobs that cannot be opened by hooves or paws.

The caged walking pathways are built so that when a tree falls on them, they are crushed, not broken, so that wild animals cannot enter the pathway. Also, there is protection against lightning bolts.

A "basement aquarium." In this version of the "cage homes," the basement walls act as a giant aquarium, perhaps many miles long, allowing the residents to observe aquatic life. The aquarium walls are designed with a double type of see-through wall made out of two different materials (plastic, acrylic, plexiglass, etc.), so that if one is shattered, the other remains in tact. One glass wall can be replaced from the inside; the other glass can be replaced from outside the units. An air space between the two walls allows water to be suctioned out after replacement. The glass walls are supported by bars, vices, bolts and a sticky sealant gum. The ceiling of the basement of the aquarium wall is above water level so that in the event of a broken window the occupants would not drown. Note: acrylic plexiglass can withstand pressure up to 40,000 pounds. The floor above an aquatic basement may also be water tight for protection against flooding. For water aquariums without an in and out going stream, a cleaning drainage system may be installed.

For small creeks, various pools can be built next to the homes with barriers separating them with one pool gently flowing into the next.

For slow-moving water with minimum risk of rising tides, severe storms, and major floods, homes may be built on the water as in Venice, to capture the interaction and diversity of life both on and off the land; the house may be built on stilts, or a rock platform.

The North American guppy or other small fish are periodically introduced to ponds to greatly reduce the threat of mosquitoes. Swallow homes are also placed in the habitat for the same purpose, as well as bat homes.

The aquarium-like basement includes an interior light to increase aquatic viewing.

Another difference between the aquarium basement and a typical home is that all four walls and the floor are watertight, for a worst case scenario of one home flooding several others.

For the critically endangered bog turtle whose only habitat is the springs at the bottom of hills creating streams. The springs can be preserved by building homes without basements on cement slabs at a sufficient distance from the springs to allow the underground streams to create the springs. In front of the building on the other side of the habitat up the hill would be a canal to capture the rain water, and perhaps a water lily garden pond. The water would be directed to flow slowly underneath the building and cement slabs, through pipes perhaps every six inches.

The endangered bog turtles' habitat is basically a muddy pasture quite often less then a hundred acres, where cows are often present, and the small turtle hides underneath the mud. This view would be a hard sell to potential customers. So small populations of other animals may be kept in the habitat, but incomplete biodiversity food chain ecosystems, limits of available plants for herbivores, and the absence of large predators could make a sustainable population impractical. Three hundred years ago in the exact same bog turtle muddy pasture habitat lived larger animals, including bison, elk, moose, deer, turkeys, etc. A lone black bear (primarily a vegetarian scavenger) and cougars are other possibilities. Since a cougar will kill and eat a raccoon, the bog turtle's chief predator, the bog turtle's population could actually be increased with a cougar. These views could attract homeowners and businesses to the location while views of a muddy pasture with the invisible bog turtle buried in mud could not. Views of exotic animals from other parts of the world would have an even greater attraction to potential customers, and these animals would not necessarily have to have sustainable populations, while a bog turtle or other native species could survive in the enclosed habitat. If a biodiversity problem became apparent, endangering the target species survival, the intruding species could be removed or managed.

Some residents may wish to install a waterfall or fountain in their unit, pumping in water from the habitat. This will have added benefits such as cooling off the unit during summer months and adding oxygen to the water where the need is greater during the summer months.

Another version of the "aquarium caged home" is a "Monet Japanese Garden water lily pond." In this case, the surface land area of the habitat has no human restrictions. The captured wildlife is underwater, surrounded by the home's giant aquarium walls. The residents could watch not only the fish, but turtles, birds swimming underwater, frogs, various other amphibians, water snakes, etc. Humans are not allowed to go swimming.

In another version of the cage homes, the homes would encircle an enclosure, but instead of having open air over top the habitat, huge insulated glass windows are over top, allowing sun and heat in, keeping the habitat warm and moist, thus having the ability to have a tropical rain forest habitat in a freezing city. The habitat can have three different distinct levels: an aquarium basement, land for terrestrial animals, and a canopy for tree top animals. This habitat may not be self-sustaining.

Another version of "Wildlife Homes" is where the cage home has a border along the boundaries of a public park or wildlife habitat sanctuary such as Yellowstone or the Everglades. This has additional benefits such as securing wolves or cougars from nearby residential homes or farm areas. The "cage homes" may not completely surround the parks, because of an ocean, mountains, the arctic, buffer zones, dam, or other reasons. This structure is very similar to the others in that it is built along a line, possibly many miles, the walls of the homes facing the habitat acting as a viewing cage. This may also be used to border an ocean shore for undisturbed beach viewing such as aquatic animals sunning on the beach, bird and turtle nesting, etc. In this case, there is no possibility of surrounding the habitat, and consequently the cage homes would border only one side, but again the residents are unable to enter the habitat from their home, and the homes would act as a cage, keeping any other animal or person from entering the habitat from the non-habitat side of the resident's home. This also extends the protected range of animals surviving in the park and thus increases the animal population, particularly large carnivores.

For "habitat fragmentation," where one habitat is separated from another, a pathway surrounded by caged homes is built to link the two habitats. The width can be up to one hundred yards wide to allow populations of one species to migrate from one sanctuary to the next, and increase the probability of success for larger animals, particularly carnivores. If two parcels of land are separated by a road, a land bridge connects the two. On each side of the bridge are walls matching the height of the residential home wall cage; homes are not necessarily built on the bridge. The bridge may also have paths for humans. The WildLife Homes are built along the street or highway separating the properties. A bridge going over the habitat may also be built to allow cars to drive through, and animals to travel under; the bridge would be of significant height and width as not to disturb the animals.

For bodies of water attaching other bodies of water, an underwater cage bar tunnel may connect the two bodies of water under the residential homes or a cage bar wall separating the two bodies with or without other homes built on top of the cage. The underwater tunnel may allow migrating fish to swim through, but not large animals. The tunnel cage at the surface does not allow surface swimming animals through, as it is made of screens and bars. It may have perhaps a 45-degree slope going down underwater to perhaps 15 feet directing aquatic creatures to swim in that direction, then the screen portion of the cage disappears and only bars with sufficient spaces to allow fish or other small aquatic creatures to swim through, but not large animals. Depending on the size, the tunnel may have observation windows. For large streams and rivers, a bar screen fence acts as a cage to the habitat, allowing fish and water through, but not larger animals. This would probably not have homes built on it, but would probably have walking trails.

For particularly large habitats, like 100 plus square miles, there may be attached cage homes entering in from the habitat perimeter, connected to the outer rim of the caged homes bordering the habitat. In this case, two rows of caged homes are built parallel to each other and a service road for car traffic is between the homes. An underground tunnel or bridge for car traffic may be used to connect one of these "interior groups of homes" to another on the other side. The tunnel would go underneath the habitat allowing animals through as if it was part of the habitat, and cars to go underneath.

Animal feeding would be primarily from what is growing wild in the habitat, but additional feeding may include from the residents decks and along the fenced in walking paths. The devices may include: 45-degree angle tubes leading to feeding bowls, and baskets with strings for squirrels and primates to pull up.

The top of the habitat may or may not include a net, to either allow birds to fly in and out, or restrict them to the habitat.

The residential homes may have a moat separating the land from the resident's homes.

In some cases the side of the caged habitat can be the side of a school, giving children a view of the wildlife habitat. The school is also given a private path to the habitat, not available to other residents. The fence cage habitat has to be available for maintenance and inspection by the managers of the habitat.

For habitat maintenance management, and biological study there is a secured entrance.

For fire safety and rain droughts there may be a large pole tower with a sprinkler hose. This can be disguised as a large bird poach or nest.

A "social center/café" may be built in the habitat. The outer rim of the café walls serve as the cage. The café may be a circular structure with an open courtyard in the center for humans. Electrical music and sound systems are not present; the sounds of humans and wildlife are available exclusively, as it may have been 100 years ago.

The size and topography of the habitat are a function of the target animal's food chain, wildlife niches, favorite seasonal plant foods, adequate populations to avoid inbreeding, the various animals preferred territorial range, optimal hiding, rooting, or nesting places, and preferred number of variable social groups to maintain an optimal self-sustaining, stable, and balanced population.

Having described the invention 'WildLife homes,' what is claimed is:

1. An impenetrable wall cage composed of attached connecting residential homes, commercial buildings, and/or other buildings to enclose a wildlife habitat zoology sanctuary refuge wherein:
   the attached homes, condominiums or townhouses have living quarters, living rooms, bed rooms, kitchens, bathrooms, electrical outlets, and plumbing;
   the commercial buildings include, but are not limited to businesses, offices, retail centers, motels, hotels, restaurants, bars, nightclubs, amusement centers, not-for-profit buildings or other buildings where people and organizations generally meet for commerce as can be found in any society or town, with the exception that the buildings are connected together to form a cage around a wildlife habitat;
   the walls of the homes facing the habitat have shatter proof glass windows, a caged terrace, or a solid wall of sufficient height to prevent animals from escaping;
   the caged habitat is not directly accessible from the buildings that form the cage;
   the caged habitat is accessible to people in limited fashion, in that the habitat can be observed through the windows of the buildings or people can hike through restricted or caged walking paths that enter the habitat; and
   the habitat targets endangered species, where appropriate.

2. The building composed cage structure of claim 1 wherein attached connecting residential homes, commercial buildings, and/or other buildings enclose a wildlife habitat zoology sanctuary refuge that is self-sustaining.

3. The building composed cage structure of claim 1 wherein attached connecting residential homes, commercial buildings, and/or other buildings enclose a wildlife habitat zoology sanctuary refuge that is not self-sustaining and requires intervention for the habitat to survive.

4. The building composed cage structure of claim 1 wherein people in the buildings that compose the cage structure have access to the habitat from the buildings, yet the buildings still serve as a cage to enclose the habitat.

5. The building composed cage structure of claim 1 wherein attached connecting residential homes, commercial buildings, and/or other buildings, in combination with cage fences, walls, natural barriers, and/or barriers enclose a wildlife habitat zoology sanctuary refuge.

6. The building composed cage structure of claim 5 wherein one or more border of the habitat is not caged by buildings or barriers, allowing habitat animals to migrate.

7. The building composed cage structure of claim 1 wherein attached connecting residential homes, commercial buildings, and/or other buildings independently enclose a wildlife habitat zoology sanctuary refuge without the aid of additional structures such as fences, walls, natural barriers, or buffers.

8. The building composed cage structure of claim 1 wherein one or more of the buildings that compose the cage structure have basement walls and/or floors that are transparent and waterproof.

9. The building composed cage structure of claim 8 wherein the individual building units with transparent and waterproof walls and/or floors are waterproofed, such that, in the event an individual building unit became flooded, the neighboring building units would not become flooded.

10. The building composed cage structure of claim 1 wherein the enclosed habitat is covered by insulated glass ceilings, allowing the sun and heat to enter the habitat and keep the habitat warm and moist.

11. The building composed cage structure of claim 7 wherein attached connecting residential homes, commercial buildings, and/or other buildings completely enclose the boundaries of a public park or wildlife habitat sanctuary.

12. The building composed cage structure of claim 5 wherein attached connecting residential homes, commercial buildings, and/or other buildings, in combination with cage fences, walls, natural barriers, and/or barriers enclose a public park or wildlife habitat.

13. The building composed cage structure of claim 6 wherein one or more border of the public park or wildlife habitat is not caged by buildings or barriers, allowing habitat animals to migrate.

14. The building composed cage structure of claim 1 wherein there is habitat fragmentation and one habitat is isolated from another, but a migration corridor, surrounded by the cage homes, commercial buildings, and other buildings, allows animal populations to migrate from habitat to habitat, but not escape from the cage structure.

15. The building composed cage structure of claim 1 wherein:
   an animal inaccessible road for human traffic passes through the enclosed habitat;
   the road separates the enclosed land, creating two or more parcels of land within the caged enclosure;
   the road separated parcels of land are connected by one or more land bridges;
   the land bridge is wide enough to allow habitat animals to cross over the bridge, and cars to travel under; and the land bridge has walls on each side of the bridge that are of sufficient height to prevent animals from escaping.

16. The building composed cage structure of claim 1 wherein there is an underwater cage bar tunnel or underwater cage screen tunnel located at one of the borders of the cage structure, allowing migrating fish, but not animals, to escape from the enclosed habitat to a body of water outside of the enclosed habitat.

17. The building composed cage structure of claim 1 wherein a social center or café is built into the habitat, with the outer rim of the social center's walls being cage walls.

18. The building composed cage structure of claim 17 wherein a caged, animal inaccessible path leads from the area outside of the building enclosed habitat to the social center or café.

19. The building composed cage structure of claim 1 wherein a raised boardwalk crosses over the enclosed habitat.

20. The building composed cage structure of claim 19 wherein the poles supporting the boardwalk serve as a cage barrier, preventing animals from entering or leaving the enclosed habitat.

21. A method for a way to protect wild animals, plants and habitats, by isolating populations within an impenetrable wall cage composed of attached connecting residential homes, commercial buildings, and/or other buildings to enclose a wildlife habitat zoology sanctuary refuge wherein:

the attached homes, condominiums or townhouses have living quarters, living rooms, bed rooms, kitchens, bathrooms, electrical outlets, and plumbing;

the commercial buildings include, but are not limited to businesses, offices, retail centers, motels, hotels, restaurants, bars, nightclubs, amusement centers, not-for-profit buildings or other buildings where people and organizations generally meet for commerce as can be found in any society or town, with the exception that the buildings are connected together to form a cage around a wildlife habitat;

the walls of the homes facing the habitat have shatter proof glass windows, a caged terrace, or a solid wall of sufficient height to prevent animals from escaping;

the caged habitat is not directly accessible from the buildings that form the cage;

the caged habitat is accessible to people in limited fashion, in that the habitat can be observed through the windows of the buildings or people can hike through restricted or caged walking paths that enter the habitat;

the habitat targets endangered species, where appropriate; and the size and the topography of the habitat is a function of the target animals' food chain, wildlife niches, favorite seasonal plant foods, population size requirements, preferred territorial range, optimal hiding places, optimal rooting places, optimal nesting places, and preferred number of variable social groups required to maintain an optimal, self-sustaining, stable, and balanced population.

\* \* \* \* \*